United States Patent
Bill et al.

(10) Patent No.: US 10,135,624 B2
(45) Date of Patent: Nov. 20, 2018

(54) WIRELESS SENSOR ARCHITECTURE

(71) Applicants: Airbus Operations Limited, Bristol (GB); Airbus Operations GmbH, Hamburg (DE)

(72) Inventors: Andrew Bill, Bistol (GB); Kurt Bruggemann, Bristol (GB); Timo Warns, Hamburg (DE)

(73) Assignees: AIRBUS OPERATIONS LIMITED, Bristol (GB); AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 15/606,349

(22) Filed: May 26, 2017

(65) Prior Publication Data
US 2017/0345230 A1  Nov. 30, 2017

(30) Foreign Application Priority Data

May 27, 2016 (GB) .................................. 1609420.3
Sep. 20, 2016 (GB) .................................. 1615976.6

(51) Int. Cl.
| | | |
|---|---|---|
| G08B 21/00 | (2006.01) | |
| H04L 9/32 | (2006.01) | |
| B64D 45/00 | (2006.01) | |
| H04L 29/06 | (2006.01) | |
| H04W 88/04 | (2009.01) | |
| H04W 12/08 | (2009.01) | |

(Continued)

(52) U.S. Cl.
CPC .......... *H04L 9/3271* (2013.01); *B64C 25/001* (2013.01); *B64D 45/00* (2013.01); *G07C 5/008* (2013.01); *H04L 9/0819* (2013.01); *H04L 9/321* (2013.01); *H04L 63/045* (2013.01); *H04L 63/0492* (2013.01); *H04L 63/062* (2013.01); *H04W 12/08* (2013.01); *H04W 88/04* (2013.01); *B64C 25/34* (2013.01); *B64C 25/42* (2013.01); *B64C 25/50* (2013.01); *G06F 21/44* (2013.01); *H04L 9/0838* (2013.01); *H04L 63/08* (2013.01); *H04L 63/166* (2013.01); *H04L 2209/80* (2013.01); *H04W 12/04* (2013.01); *H04W 48/08* (2013.01); *H04W 88/08* (2013.01)

(58) Field of Classification Search
CPC ................................ G07C 5/008; G08C 17/02
USPC ...................... 340/960, 945, 953, 971, 995.1
See application file for complete search history.

(56) References Cited

U.S. PATENT DOCUMENTS

| | | | |
|---|---|---|---|
| 8,332,133 B2 * | 12/2012 | Ferro | .................... G08G 5/0013 |
| | | | 701/120 |
| 8,787,904 B1 | 7/2014 | Hayes et al. | |

(Continued)

FOREIGN PATENT DOCUMENTS

| | | |
|---|---|---|
| CN | 103442359 | 12/2013 |
| EP | 1803249 | 7/2007 |

(Continued)

*Primary Examiner* — Tai T Nguyen
(74) *Attorney, Agent, or Firm* — Nixon & Vanderhye PC

(57) ABSTRACT

A Wireless Access Point (WAP) for enabling remote access to data generated by systems of an aircraft including a wireless interface having a transmitter and a receiver; and a processor. The WAP is configured to: wirelessly receive sensor data generated by a plurality of sensors on an aircraft; receive aircraft data from an avionics system of the aircraft; wirelessly receive a data request signal from a remote computing device; and, responsive to the data request signal, wirelessly transmit to the remote computing device data based on received sensor data and/or received aircraft data.

25 Claims, 8 Drawing Sheets

(51) Int. Cl.
*B64C 25/00* (2006.01)
*G07C 5/00* (2006.01)
*H04L 9/08* (2006.01)
*G06F 21/44* (2013.01)
*H04W 12/04* (2009.01)
*H04W 48/08* (2009.01)
*B64C 25/34* (2006.01)
*B64C 25/42* (2006.01)
*B64C 25/50* (2006.01)
*H04W 88/08* (2009.01)

(56) References Cited

U.S. PATENT DOCUMENTS

| | | |
|---|---|---|
| 9,008,868 B1 | 4/2015 | Bantoft et al. |
| 9,043,938 B1 | 5/2015 | Raghu et al. |
| 2004/0073571 A1* | 4/2004 | Kumhyr ................. G08G 1/005 |
| 2009/0243895 A1 | 10/2009 | Mitchell et al. |
| 2010/0290622 A1 | 11/2010 | Garcia Morchon et al. |
| 2014/0028818 A1 | 1/2014 | Brockway, III et al. |
| 2014/0376721 A1 | 12/2014 | Perez et al. |
| 2015/0203216 A1 | 7/2015 | Goldstein et al. |
| 2016/0334786 A1* | 11/2016 | Warpinski ............ G05D 1/0022 |

FOREIGN PATENT DOCUMENTS

| | | |
|---|---|---|
| EP | 1876759 | 1/2008 |
| EP | 1993301 | 11/2008 |
| EP | 2031538 | 3/2009 |
| EP | 2706423 | 3/2014 |
| WO | 2007041824 | 4/2007 |
| WO | 2013121076 | 8/2013 |

* cited by examiner

WIRELESS SENSOR ARCHITECTURE

RELATED APPLICATIONS

This application claims priority to United Kingdom Patent Applications GB 1615976.6 filed 20 Sep. 2016 and GB 1609420.3 filed 27 May 2016, the entire contents of each of which are hereby incorporated by reference.

TECHNICAL FIELD

The present invention relates to vehicle sensor systems and particularly, although not exclusively, to a Wireless Access Point (WAP) for enabling remote access to data generated by systems of an aircraft.

BACKGROUND

Modern vehicles (such as aircraft) typically include multiple sensors to measure various parameters relating to the vehicle and its operation. For example, a commercial airliner may have a plurality of sensors (such as, for example, tyre pressure sensors and brake temperature sensors) associated with a landing gear, as well as various other sensors on other parts of the aircraft. These sensors are connected by wired communications links to avionics systems of the aircraft, located in the fuselage, which process the sensor data and provide information to displays in the cockpit. It may generally not be possible to access the output of the sensors without entering the cockpit to view these displays. However, the sensor data may be of significant usefulness to ground crew tasked with checking and maintaining the aircraft when it is on the ground. It may not be possible or convenient for ground crew to enter to cockpit to obtain the sensor data, meaning that ground crew must use separate sensors to obtain the same data already being measured by the aircraft on-board sensors. It is therefore desirable to provide a way for ground crew to remotely access the sensor data gathered by an on-board sensor of a vehicle.

SUMMARY

A first aspect of the present invention provides a Wireless Access Point (WAP) for enabling remote access to data generated by systems of an aircraft. The WAP comprises a wireless interface comprising a transmitter and a receiver; and a processor. The WAP is configured to: wirelessly receive sensor data generated by a plurality of sensors on an aircraft; receive aircraft data from an avionics system of the aircraft; wirelessly receive a data request signal from a remote computing device; and responsive to the data request signal, wirelessly transmit to the remote computing device data based on received sensor data and/or received aircraft data.

Optionally, the WAP is configured to receive at least some of the sensor data from a relay comprised in a communications path between the WAP and a sensor of the plurality of sensors.

Optionally, the WAP is configured to receive the aircraft data from the avionics system over a wired connection between the WAP and the avionics system.

Optionally, the WAP is configured to be comprised in a landing gear of the aircraft during operation of the WAP.

Optionally, the WAP is further configured to receive, from the avionics system, further sensor data generated by at least one further sensor on the aircraft.

Optionally, the data transmitted to the remote computing device comprises data covering a specific time period. The specific time period may, for example, be specified by the data request signal received from the remote computing device.

Optionally, the data transmitted to the remote computing device comprises data from one or more specific sensors. The one or more specific sensors may, for example, be specified by the data request signal received from the remote computing device.

Optionally, the data transmitted to the remote computing device comprises aircraft data of a specific type. The specific type may, for example, be specified by the data request received from the remote computing device.

Optionally, the WAP further comprises a memory, and the WAP is further configured to store the received sensor data and received aircraft data in the memory. In such examples the transmitted data may be based on sensor data and/or aircraft data stored in the memory. Optionally, the memory stores identifying information associated with the WAP. In such examples the WAP may be further configured to wirelessly transmit the identifying information to the remote computing device responsive to an identification request signal received from the remote computing device.

Optionally, the WAP is configured such that it is able to wirelessly communicate with the remote computing device when the remote computing device is within a predetermined perimeter, and is not able to wirelessly communicate with the remote computing device when the remote computing device is outside the predetermined perimeter.

A second aspect of the invention provides an aircraft landing gear. The aircraft landing gear comprises a plurality of sensors and a WAP according to the first aspect. Each sensor of the plurality of sensors is configured to generate sensor data relating to a different aircraft parameter.

Optionally, a wireless communications link connects at least one sensor of the plurality of sensors to the WAP. The wireless communications link may, for example, be a secure wireless communications link.

Optionally, the aircraft landing gear further comprises a relay having a wired communications link to at least one sensor of the plurality of sensors and a wireless communications link to the WAP. The relay may, for example, be configured to receive sensor data generated by the at least one sensor over the wired communications link and to transmit the received sensor data to the WAP over the wireless communications link. Optionally, the wireless communications link between the relay and the WAP is a secure wireless communications link. Optionally the relay may have a wireless communications link to the remote computing device.

Optionally, the landing gear comprises a bogie and the relay is located on the bogie. Optionally, the landing gear comprises an axle and the relay is located on the axle. Optionally, the landing gear comprises a landing gear leg and the relay is located on the landing gear leg. Optionally the landing gear comprises a brake pack having a housing, and the relay is located on the brake pack housing.

Optionally, the plurality of sensors comprises one or more of: at least one tyre pressure sensor; at least one brake temperature sensor; at least one brake wear sensor; at least one landing gear load sensor; at least one wheel speed sensor; at least one proximity sensor; at least one pressure sensor (which may comprise, for example, an oleo pressure sensor and/or a brake pressure sensor); at least one position sensor; at least one fuel data sensor; at least one oleo temperature sensor.

Optionally, the plurality of sensors comprises at least one first sensor having a wired communications link to the relay, and at least one second sensor having a wireless communications link to the WAP. The at least one first sensor may, for example, comprise a brake temperature sensor or a brake wear sensor. The at least one second sensor may, for example, comprise one or more of: a tyre pressure sensor; a wheel speed sensor; a landing gear load sensor; a brake wear sensor; a fuel data sensor; an oleo pressure sensor; an oleo temperature sensor; a proximity sensor; a towing sensor; a brake pressure sensor; and a steering angle sensor.

Optionally, the plurality of sensors comprises a steering angle sensor having a communications link with an avionics system of the aircraft, wherein the steering angle sensor is configured to transmit steering angle sensor data to the avionics system, and wherein the WAP is configured to receive steering angle sensor data from the avionics system. Optionally, the plurality of sensors comprises a landing gear load sensor having a communications link with an avionics system of the aircraft, wherein the landing gear load sensor is configured to transmit landing gear load sensor data to the avionics system, and wherein the WAP is configured to receive landing gear load sensor data from the avionics system. Optionally, the plurality of sensors comprises a towing sensor having a communications link with an avionics system of the aircraft, wherein the towing sensor is configured to transmit towing sensor data to the avionics system, and wherein the WAP is configured to receive towing sensor data from the avionics system.

Optionally, at least one sensor of the plurality of sensors comprises a memory, and the memory stores identification information associated with the sensor. Optionally, the at least one sensor is configured to store generated sensor data in the memory.

A third aspect of the invention provides an aircraft. The aircraft comprises a landing gear according to the second aspect; and an avionics system having a wired communications link to the WAP of the landing gear.

Optionally, the avionics system is configured to receive sensor data from at least one sensor on the aircraft, and to transmit the received sensor data to the WAP.

Optionally, the aircraft further comprises a memory accessible by the avionics system. The memory may, for example, store aircraft data and the avionics system may be configured to transmit the aircraft data to the WAP in response to receiving a data request from the WAP. Optionally, the avionics system is configured to receive sensor data from at least one sensor on the aircraft and/or from the WAP, and to store the received sensor data in the memory.

A fourth aspect of the invention provides a method for remotely accessing data generated by systems of an aircraft. The method comprises: generating sensor data by each of a plurality of sensors on the aircraft; wirelessly receiving the generated sensor data at a Wireless Access Point (WAP) located remotely from each of the plurality of sensors; receiving aircraft data from an avionics system of the aircraft; wirelessly receiving a data request from a remote computing device; and responsive to receiving the data request, wirelessly transmitting to the remote computing device data based on received sensor data and/or received aircraft data.

BRIEF DESCRIPTION OF THE DRAWINGS

Embodiments of the invention will now be described, by way of example only, with reference to the accompanying drawings, in which:

FIG. 11b is a schematic view of a main landing gear of the example aircraft of FIG. 11a.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

A challenge exists in providing remote access to the data collected by on-board sensors of a vehicle such as an aircraft. Current aircraft on-board sensors may communicate data to avionics systems of the aircraft, via a wired communications link between each sensor and the avionics system. This configuration precludes a remote computing device outside the aircraft from being able to communicate with the on-board sensors or access sensor data collected by the on-board sensors, at a high assurance level.

The examples described herein seek to address this challenge by providing an integrated wireless communications architecture for a vehicle. Such a wireless architecture may enable data collected by on-board sensors to be wirelessly communicated to a remote computing device (that is, a computing device located outside of the vehicle), and may in some examples also enable sensor data to be wirelessly communicated between an on-board sensor and an avionics system of the aircraft, obviating the need for a wired connection therebetween. A key part of such a wireless communications architecture may be one or more Wireless Access Points (WAPs) for enabling remote access to data generated by systems of an aircraft.

Figure 1:
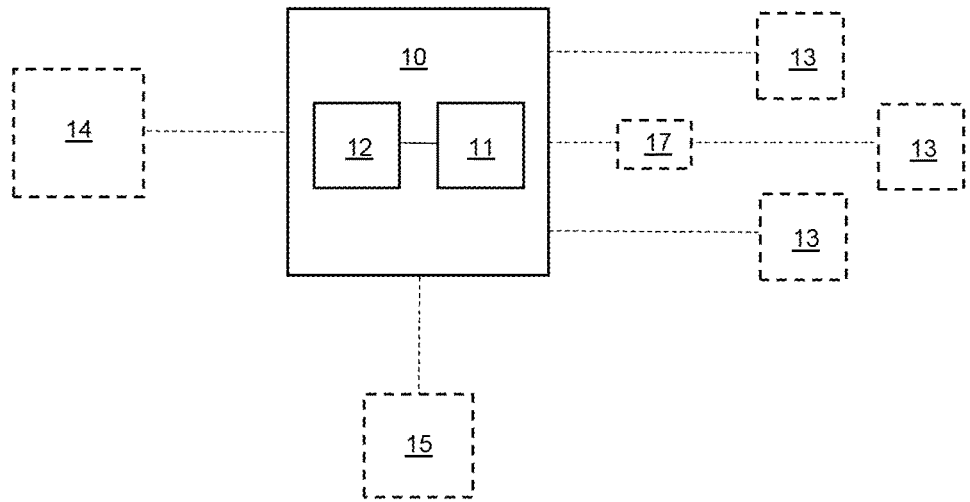
FIG. 1 is a schematic view of a wireless access point (WAP) according to an example.

FIG. 1 is a simplified schematic block diagram of an example WAP 10 for enabling remote access to data generated by systems of an aircraft. The WAP 10 comprises a wireless interface 11 comprising a transmitter and a receiver; and a processor 12. The WAP 10 is configured to wirelessly receive sensor data generated by a plurality of sensors 13 which are located on an aircraft. In some examples the WAP 10 receives data from at least one of the sensors 13 via a relay 17. The WAP 10 is further configured to receive aircraft data from an avionics system 14 of the aircraft. The WAP 10 is further configured to wirelessly receive a data request signal from a remote computing device 15 (which is not located on the aircraft); and responsive to the data request signal, wirelessly transmit to the remote computing device 15 data based on received sensor data and/or received aircraft data. The sensors 13, relay 17, avionics system 14 and remote computing device 15 are shown using dashed lines to indicate that they are not part of the WAP 10. The dashed lines connecting the sensors 13, avionics system 14, relay 17 and remote computing device 15 to the WAP represent communications links. The communications links between each sensor 13 and the WAP are at least partly wireless, as is the communication link between the remote computing device 15 and the WAP 10. The communications link between the WAP 10 and the avionics system 14 may be wired or wireless (or partly wired and partly wireless). For example, in some implementations the WAP 10 is configured to receive the aircraft data from the avionics system over a wired connection between the WAP 10 and the avionics system 14. The communications link between the relay 17 and a sensor 13 may be wired or wireless. In some examples, direct wireless communication between a sensor 13 and the remote computing device 15, and/or between the relay 17 and the remote computing device 15, may be possible.

The plurality of sensors 13 may comprise sensors configured to generate sensor data relating to different aircraft parameters. In one example, each of the plurality of sensors 13 is configured to generate sensor data relating to a different aircraft parameter. In some examples two or more sensors of the plurality of sensors may be configured to generate sensor data relating to the same aircraft parameter. For example, the plurality of sensors may comprise a tyre pressure sensor in respect of each tyre on a particular landing gear. Any given sensor of the plurality of sensors may comprise one of: a tyre pressure sensor; a brake temperature sensor; a brake wear sensor; a landing gear load sensor; a wheel speed sensor; a proximity sensor; a pressure sensor (e.g. an oleo pressure sensor or a brake pressure sensor); a position sensor; a steering angle sensor; a towing sensor (e.g. a sensor to detect when the aircraft is being towed, and/or to measure a parameter related to towing of the aircraft); a sensor for measuring fuel data.

Any given sensor of the plurality of sensors 13 may comprise a memory. The memory may, for example, store identification information associated with the sensor. Such identification information may be communicated to the WAP together with generated sensor data, e.g. by tagging the generated sensor data with the identification information. The sensor may also, in some examples, be configured to store generated sensor data in the memory. In some examples the sensor further comprises a processor, and is configured to perform processing operations on sensor data stored in the memory. The results of such processing operations may also be stored in the memory. Generated sensor data which is sent by the sensor to the WAP may be retrieved from the memory by the sensor.

Sensors comprised in the plurality of sensors 13 may differ in their general location on the aircraft, and/or may differ in the nature of the communications link with the WAP 10. As mentioned above, a communications link between a given sensor 13 and the WAP 10 is at least partly wireless, with the wireless part being such that sensor data is wirelessly received by the WAP. For sensors which are located such that direct wireless communication with the WAP 10 is possible, the communications link to the WAP 10 may be a direct wireless link. Sensors for which a direct wireless link may be possible include a tyre pressure sensor; a brake wear sensor; a wheel speed sensor; a landing gear load sensor; a steering angle sensor; a towing sensor; a sensor for measuring fuel data; an Oleo pressure sensor; an Oleo temperature sensor; a proximity sensor; a brake fluid pressure sensor. However, for sensors which are not suitably located to enable such direct wireless communication, a relay (e.g. the relay 17) may be comprised in the communications link. In some such examples, the relay has a wired communications link to at least one sensor of the plurality of sensors, and a wireless communications link to the WAP. In other examples the relay has a wireless communications link to both the at least one sensor and the WAP. The relay is configured to receive sensor data generated by the at least one sensor over the communications link with the at least one sensor and to transmit the received sensor data to the WAP over the wireless communications link with the WAP.

Sensors on an aircraft which may communicate with the WAP via a relay include a brake temperature sensor and a brake wear sensor. These sensors may generally be located such that a direct wireless communications path does not exist between the sensor and the WAP (e.g. because of signal-attenuating structures between the sensor and the WAP). In some examples the relay is located on a landing gear. Example locations for a relay on a landing gear include: on a bogie of the landing gear; on an axle of the landing gear, on a leg of the landing gear; on a brake pack housing of a brake comprised in the landing gear.

In some examples the WAP 10 is configured to be comprised in a landing gear of the aircraft during operation of the WAP. Being located on a landing gear may advantageously permit the WAP to be close enough to any of the sensors 13 which are comprised in the landing gear to enable wireless communication with those sensors 13. It may be particularly advantageous for sensors located on the lower landing gear to be able to wirelessly communicate with the WAP, because a wired communications link may require significant protection from the harsh environment of the lower landing gear in order to operate reliably. Being located on a landing gear may also advantageously permit a user of the remote computing device 15 to get close enough to the WAP 10 to enable wireless communication between the WAP 10 and the remote computing device 15. If the WAP 10 is on an upper part of a landing gear, a reliable wired connection between the WAP 10 and the avionics system 14 can easily be provided, because such a wired connection would not need to pass through the harsh environment of the lower landing gear.

The sensor data may comprise a measurement signal generated by each of the plurality of sensors 13. Such a measurement signal may comprise, e.g. a current value of a parameter measured by a given sensor 13, a time-series of values of a parameter measured by a given sensor 13, an average value for a specific time period of a parameter measured by a given sensor 13, etc. The particular nature of a given measurement signal may depend on the type of the sensor 13 which generated that measurement signal. The sensor data may comprise a plurality of measurement signals of differing types.

In some examples the avionics system is configured to receive further sensor data from at least one sensor on the aircraft (e.g. a sensor which does not have a communications link to the WAP 10), and to store the further sensor data in a memory and/or to transmit the further sensor data to the WAP 10. Similarly, the avionics system may be configured to receive the sensor data (i.e. the sensor data generated by the plurality of sensors 13) from the WAP 10 and to store the sensor data in a memory and/or to transmit the sensor data to a further WAP of the aircraft.

The WAP 10 may therefore be further configured to receive, from the avionics system 14, further sensor data generated by at least one further sensor (not illustrated) on the aircraft. In some examples the further sensor data may comprise one or more measurement signals, which may be equivalent or similar to measurement signals comprised in the sensor data. The further sensor may be of the same type as one or more sensors comprised in the plurality of sensors 13. For example, the at least one further sensor may be a sensor which does not have a direct communication link with the WAP 10. This may be the case if the WAP is comprised in a given landing gear and is configured to have communication links with sensors comprised in that landing gear, but not with sensors comprised in other landing gear (such sensors may instead have communications links with WAPs comprised in their respective landing gear). The avionics system 14 may thereby function as a relay to pass data between remotely located WAPs of an aircraft, in examples where the aircraft has more than one WAP.

The avionics system 14 may be any avionics system of the aircraft. In some examples it comprises a primary function (e.g. flight control, braking and steering, health monitoring, etc.), unrelated to facilitating the wireless architecture, in addition to the function which sends aircraft data to the WAP. In other examples the avionics system 14 may be a dedicated system for administrating the wireless architecture. The aircraft data received by the WAP 10 from the avionics system 14 may comprise aircraft data of a specific type. Types of aircraft data may include, for example, aircraft identity data, aircraft specifications, operational history, date and time, flight/ground data, nominal servicing values, alerts and warnings, maintenance messages, etc. The aircraft data may be stored in a memory accessible by the avionics system 14. In some examples, the aircraft data is sent by the avionics system 14 in response to a request for aircraft data originating from the remote computing device 15 (a data request signal), in which case the data request signal may specify the type of the aircraft data being requested. A request for aircraft data originating from the remote computing device 15 may be sent, for example, from the remote computing device 15 to the WAP 10 using a wireless communications link, then from the WAP 10 to the avionics system 14 using the communications link between the WAP 10 and the avionics system 14 (which may be wired, wireless, or a combination of both). Alternatively, in response to receiving a data request signal from the remote computing device 15 the WAP 10 may generate a new data request signal based on the received data request signal, and send the new data request signal to the avionics system 14. In response to receiving a data request signal, the avionics system 14 may transmit aircraft data as specified by the request signal to the WAP 10, which then sends it on to the remote computing device 15.

In some examples the WAP 10 further comprises a memory, and is configured to store received sensor data (including, in some examples, received further sensor data) and/or received aircraft data in the memory. In such examples the transmitted data may be based on sensor data and/or aircraft data stored in the memory. For example, each WAP 10 comprised in an aircraft may maintain an up-to-date log of sensor data obtained by the plurality of sensors 13 from which it receives data. Such a log may comprise raw sensor data, or alternatively may comprise summary data which summarizes the received sensor data. The memory may, alternatively or additionally, store identifying information associated with the WAP 10. In such examples the WAP 10 may be further configured to wirelessly transmit the identifying information to the remote computing device 15 responsive to an identification request signal received from the remote computing device 15. Such identifying information may comprise a unique identifier for the WAP 10, such as a serial number.

In some examples the processor 12 of the WAP 10 is configured to process sensor data received from the plurality of sensors 13, and/or further sensor data received from the avionics system 14. Such processing may involve, for example, tagging or otherwise associating sensor data and/or further sensor data with aircraft information received from the avionics system. For example, the aircraft information may comprise a unique identifier for the aircraft, and tagging sensor data with this unique identifier may enable easy determination (e.g. by the remote computing device 15) of the origin of the sensor data. Such processing may involve, for example, determining whether the sensor data meets predefined criteria stored by the WAP, e.g. in a memory accessible by the processor of the WAP 10. In some examples, processing of the sensor data received from the plurality of sensors 13 may comprise processing the sensor data received from the plurality of sensors 13 together with the further sensor data received from the avionics system 14, e.g. by comparing the sensor data with the further sensor data to determine a difference (if any) between the received sensor data and the received further sensor data. This may be particularly useful, for example, where the further sensor data relates to the same measured parameter as the sensor data, as differing behaviour between similar components in different locations on an aircraft (e.g. tyres on different landing gear) could indicate a problem with one of those components. In other examples, the WAP 10 may transmit the sensor data to the avionics system 14 which may perform such processing, and then may send the result of the processing back to the WAP 10.

The data which is wirelessly transmitted to the remote computing device 15 by the WAP may comprise aircraft data (e.g. aircraft data requested by the remote computing device 15). The data transmitted to the remote computing device 15 may, alternatively or additionally, comprise the received sensor data. In some examples the data transmitted to the remote computing device 15 may comprise the result of processing performed on the sensor data, further sensor data, and/or aircraft data. As mentioned above, in some examples (e.g. examples in which the aircraft data comprises aircraft identifying data), the sensor data and/or further sensor data may be tagged or otherwise associated with the aircraft data by the processor of the WAP 10 before it is transmitted to the remote computing device 15. This may be particularly useful, for example, if the type of the aircraft data is such that it provides contextual information relating to the sensor data, which may enable the remote computing device 15 to perform a detailed analysis of the sensor data.

The data transmitted to the remote computing device 15 by the WAP 10 may comprise data covering a specific time period, which may, e.g., be specified by a data request signal received from the remote computing device 15. The time period may be defined in relation to the operational cycle of the aircraft. For example, a user of the remote computing device 15 may request all sensor data relating to the most recent flight cycle of the aircraft, or all sensor data acquired since the last push-back of the aircraft, or all sensor data of a specified type acquired since the aircraft landed, or the like. The time period may alternatively be defined in relation to the current time, for example data may be requested covering a preceding 3 hour period, a preceding 3 day period, or the like.

The data transmitted to the remote computing device may comprise data from one or more specific sensors of the plurality of sensors 13. The specific sensors may, for example, be specified by the data request signal received from the remote computing device. For example, a user of the remote computing device 15 may request data from all tyre pressure sensors of the aircraft, or from all brake temperature sensors, or from all sensors comprised in a specified landing gear, or the like.

The remote computing device 15 may be any computing device located outside of the aircraft. For example, the remote computing device 15 may comprise a tablet computer configured for use by ground crew to assist with aircraft maintenance tasks. The remote computing device 15 is configured to wirelessly communicate with the WAP 10, at least when the remote computing device 15 is appropriately located (e.g. sufficiently close) with respect to the WAP 10. In some examples, as will be discussed in more detail below, the WAP 10 is configured such that it is it is able to wirelessly communicate with the remote computing device 15 when the remote computing device 15 is within a predetermined perimeter, and is not able to wirelessly communicate with the remote computing device when the remote computing device is outside the predetermined perimeter. Such a predetermined perimeter may be achieved, for example, by shielding the WAP, by configuring the transceiver of the WAP to have a limited operational range, or the like.

Figure 2:
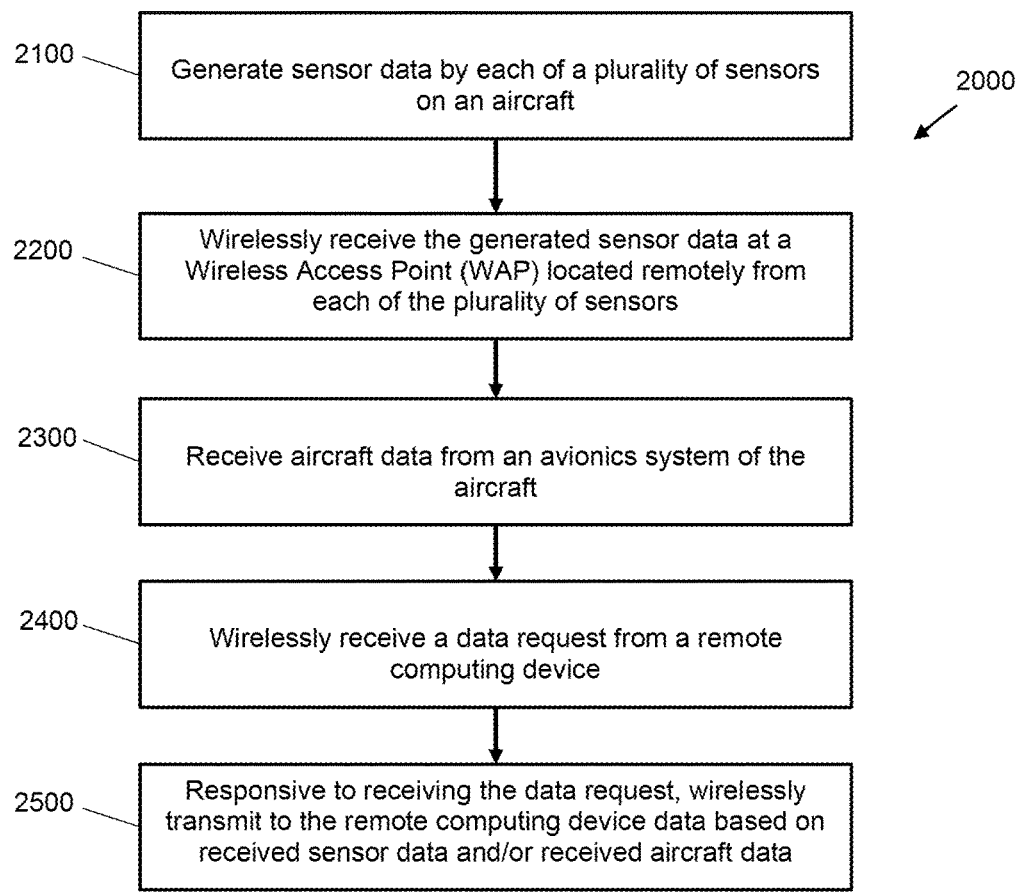
FIG. 2 is a flow diagram illustrating an example method for remotely accessing data generated by systems of an aircraft.

FIG. 2 is a flow chart that implements an example of a method 2000 for remotely accessing data generated by systems of an aircraft. The method 2000 may be at least partly performed, for example, by a WAP (e.g. the WAP 10) of this disclosure. In some examples at least one block of the method 2000 may be encoded as one or a plurality of machine readable instructions stored on a memory accessible by a processor of a WAP of this disclosure. It should be noted that, although the blocks of the method 2000 are shown and discussed in a particular order, this order is not a necessary characteristic of the method. In some examples, at least some blocks of the method 2000 may be performed in a different order to that shown in FIG. 2. For example, block 2400 may be performed before block 2200 is performed, and/or before block 2300 is performed. Indeed, in some examples block 2200 and/or block 2300 may be performed in response to block 2400.

In block 2100, sensor data is generated by each of a plurality of sensors (which may be, e.g., the sensors 13 described above) on an aircraft. The sensor data may have any of the features of the sensor data described above in relation to FIG. 1. The sensor data may be generated by the plurality of sensors in any suitable manner, depending on the particular nature of the sensors. For example, a brake temperature sensor may comprise a thermocouple, and may generate sensor data comprising a time-varying temperature signal.

In block 2200, the generated sensor data is wirelessly received at a WAP located remotely from each of the plurality of sensors. The WAP may be, for example, the WAP 10 described above. The generated sensor data may be received over a plurality of wireless links, each of which links one of the plurality of sensors to the WAP. Such wireless links may have any of the features discussed above in relation to FIG. 1. At least some of the generated sensor data may be received from a relay comprised in a communications path between the WAP and a sensor.

In block 2300, aircraft data is received, e.g. by the WAP, from an avionics system of the aircraft. The aircraft data may have any of the features described above in relation to FIG. 1. The avionics system may be, e.g., the avionics system 14 of FIG. 1. The aircraft data may be received wirelessly or from a wired connection between the WAP and another component. The aircraft data may be received via a communications link between the WAP and the avionics system. Such a communications link may have any of the features discussed above in relation to the communications link between the WAP 10 and the avionics system 14 of FIG. 1. In some examples block 2300 may be performed before, or simultaneously with block 2200.

In block 2400, a data request is received, e.g. by the WAP, wirelessly from a remote computing device (e.g. the remote computing device 15 of FIG. 1). The data request may comprise a data request signal, and may have any of the features of the data request signal described above in relation to FIG. 1. The data request may be received via a wireless communications link between the WAP and the remote computing device, which may have any of the features of the equivalent wireless communications link described above in relation to FIG. 1. In some examples block 2400 may be performed before block 2300, and/or block 2200. In such examples block 2200 and/or block 2300 may be performed responsive to the WAP receiving the data request in block 2400. For example, receiving a data request from the remote computing device may, in some examples, cause the WAP to request sensor data from one or more sensors of the plurality of sensors, and/or to request aircraft data from the avionics system. Block 2200 and block 2300 respectively may be performed in response to such requests from the WAP.

In block 2500, responsive to receiving the data request, data based on the received sensor data and/or on the received aircraft data is wirelessly transmitted to the remote computing device (e.g. by the WAP). The data transmitted to the remote computing device may have any of the features of the equivalent data described above in relation to FIG. 1. The data may be transmitted over the same wireless communications link over which the data request was received by the WAP.

In some examples, one or more of the wireless communications links comprised in the wireless architecture described above are secure wireless communications links. All of the wireless communications links may be secure wireless communications links. Examples in which at least one of the wireless communications links is a secure wireless communications link will now be discussed with reference to FIGS. 3-10.

Figure 3:
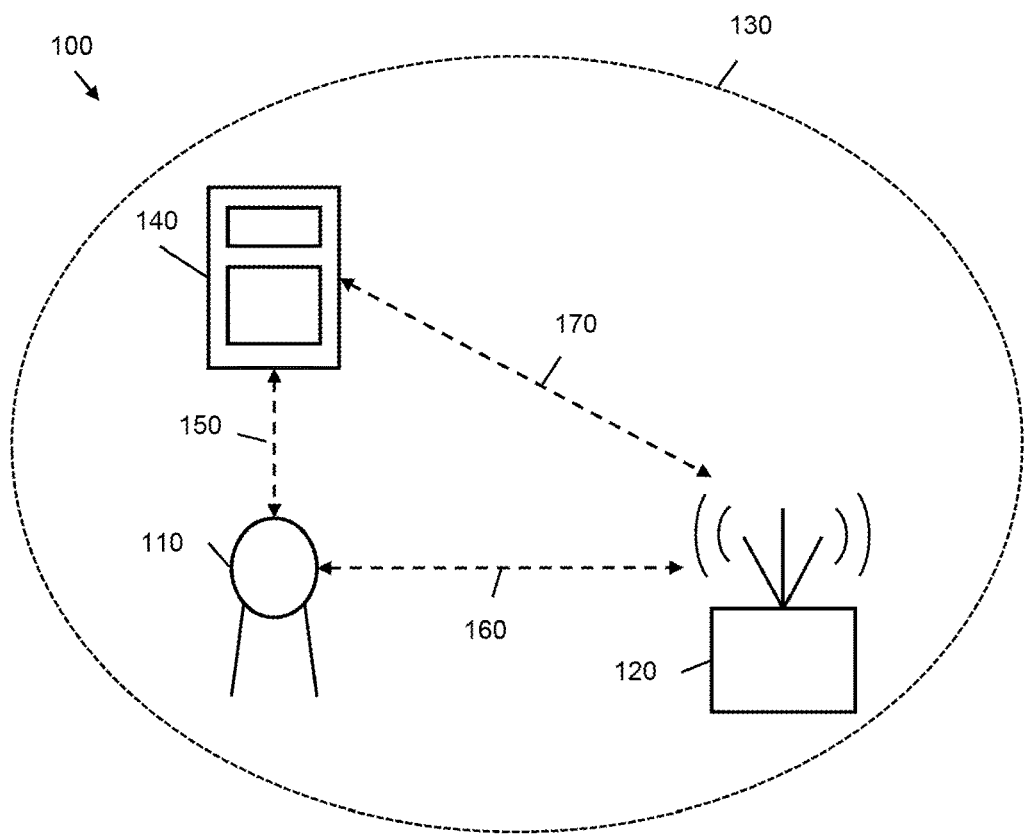
FIG. 3 is a schematic view of a computing device in communication with a system comprising a sensor and a WAP according to an example.

FIG. 3 is a simplified schematic block diagram of a system 100 according to an example. The system 100 comprises a sensor arrangement 110 (which may comprise, for example, any of the sensors 13) and a WAP 120 (which may be, for example, the WAP 10 of FIG. 1). The sensor arrangement 110 and WAP 120 are illustrated as being within a secure perimeter, which is depicted by a boundary line 130.

According to the present example, aside from a sensor, the sensor arrangement 110 comprises a wireless interface, which is adapted to transmit and receive signals within at least two pre-configured bandwidths and/or implement at least two communications protocols. The wireless interface may comprise a single antenna or multiple antennae, depending, for example, on whether different frequency ranges are required. The sensor arrangement also comprises a communications module, a processing device to facilitate processing operations and a storage device to store information. In one case the processing device comprises at least two separate processors which independently communicate with respective parts of the wireless interface to transmit signals over each of the at least two pre-configured bandwidths and/or implement the at least two communications protocols. Various different configurations of sensor arrangement may be deployed according to the specific needs of the particular implementation. In this description the terms "sensor arrangement" and "sensor" may be used interchangeably and/or as the context dictates. According to the example, the sensor 110 is adapted to receive signals from a computing device 140 (which may be, for example, the remote computing device 15 of FIG. 1) within a first pre-configured bandwidth and/or using a first protocol over a first communications channel 150, when the computing device 140 is moved into the proximity of the sensor 110 and is within the secure perimeter 130.

The WAP 120 may be any device or circuit capable of transmitting signals over one or more communications channels. In one embodiment the WAP 120 is a device comprising a memory, a processor and a wireless interface comprising a transmitter and receiver. According to a second embodiment the WAP 120 is an integrated circuit (IC) coupled to an external processor and memory. The WAP 120 may be an arrangement comprising plural components. For example, the WAP 120 may comprise a Radio Frequency (RF) module, for example including a suitable antenna or plural antennas, coupled to an external power source and microcontroller. In some embodiments, the WAP may be arranged to be communicatively coupled with other components or systems, for example via wireless or wired (or optical) connections. The WAP may thereby be arranged to receive information from the other components or systems and/or send information to the other components or systems. Such information may include that exchanged with a sensor and/or a computing device.

The computing device 140 is arranged to transmit signals via a wireless interface over the first communications channel 150, wherein the first communications channel 150 is operable inside the secure perimeter. The computing device 140 is typically controllable by an operator. The computing device 140 may communicate information such as position information of the sensor 110 relative to the WAP 120, a serial number or other identifying information related to the sensor 110 and/or commands for instructing the processing module of the sensor 110 to execute one or more operations. For example, the computing device may send a signal to the sensor instructing the processing module to generate and store data or generate messages for transmission to other devices. The sensor 110 may comprise a processing module arranged to process signals received via the wireless interface.

In one example, the first communications channel 150 is a relatively short range wireless communications channel operable inside the secure perimeter 130. For example, the first communications channel could be an infrared communications channel, a near field communications channel (NFC), or RFID. In a second example, the first communications channel is a wired channel. For example, a USB connection between the sensor 110 and computing device 140 may be used as a wired communications channel. The range of the first communications channel may dictate the distance and/or extent of the secure boundary 130 from the sensor 110.

In FIG. 3, the WAP 120 is arranged to receive signals from the sensor over a second communications channel 160 within the secure perimeter, for example, via a wireless interface of the WAP. The second communications channel 160 is a wireless communications channel over which the sensor 110 and WAP 120 are configured to communicate inside the secure perimeter. The second communications channel 160 may be, for example, a Wi-Fi channel, Zigbee channel, Ultra-Wideband channel (UWB) or a channel in a Personal Area Network (PAN). The WAP 120 comprises a processing module which is arranged to process signals received from the sensor over the second communications channel 160.

The WAP 120 is arranged to transmit signals wirelessly to the computing device 140 over a third communications channel 170 inside the secure perimeter. As described herein messages sent between the computing device 140, sensor 110 and WAP 120 can be used to establish a secure communications channel between the sensor and WAP which, in combination with the secure perimeter, protect the arrangement from man-in-the-middle attacks of the kind previously described.

Figure 4:
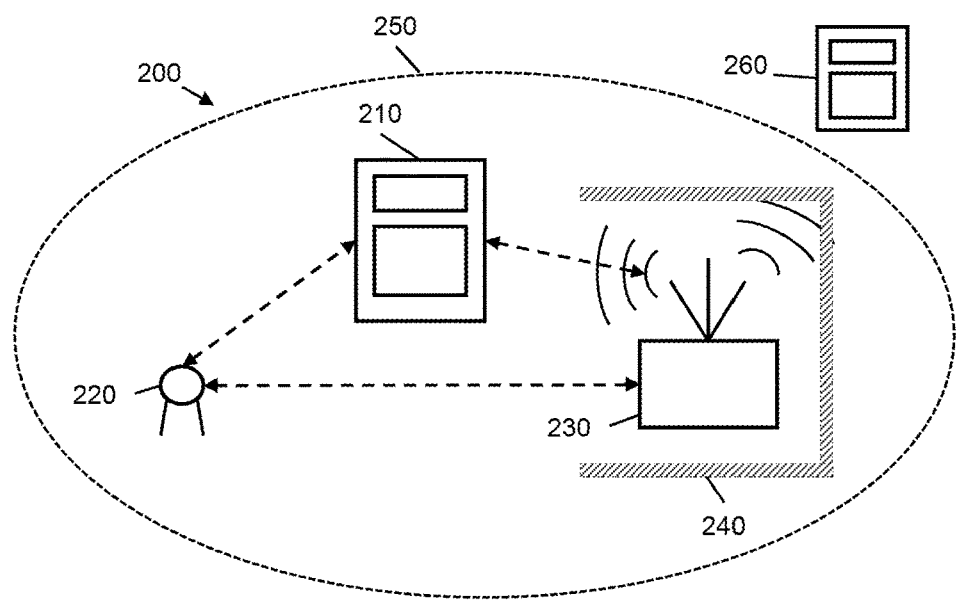
FIG. 4 is a schematic view of a system comprising a sensor and a WAP with physical shielding, in communication with a computing device, according to an example.

FIG. 4 is a simplified schematic block diagram of an exemplary system 200 and a computing device 210 (which may be, for example, the remote computing device 15 of FIG. 1 or the computing device 140 of FIG. 3). The system comprises a sensor 220 (which may comprise, for example, any of the sensors 13 of FIG. 1) and a WAP 230 (which may be, for example, the WAP 10 of FIG. 1 or the WAP 120 of FIG. 3). The WAP 230 is physically inaccessible to the computing device 210 but is in communication with the computing device 210. The WAP 230 shown in FIG. 4 is surrounded, in part, by physical shielding 240. The computing device 210 is arranged to communicate over a first communications channel with the sensor 220. The physical shielding 240 acts to prevent the wireless signal transmitted over the third communications channel from being detected outside the secure perimeter 250. In this way, the physical shielding 240 can influence the shape of the secure perimeter 250. The physical shielding 240, for example, can assist in preventing an unauthorised device, for example a computer system 260, which is located outside of the secure perimeter from being used to intercept a message transmitted by the WAP 230. In particular, a device that is able to intercept from the WAP 230 messages that are intended for the computing device 210 could potentially modify messages and relay messages of its own to the computing device 210 and, via the computing device to the sensor 220 from outside the secure perimeter 250.

Figure 5:
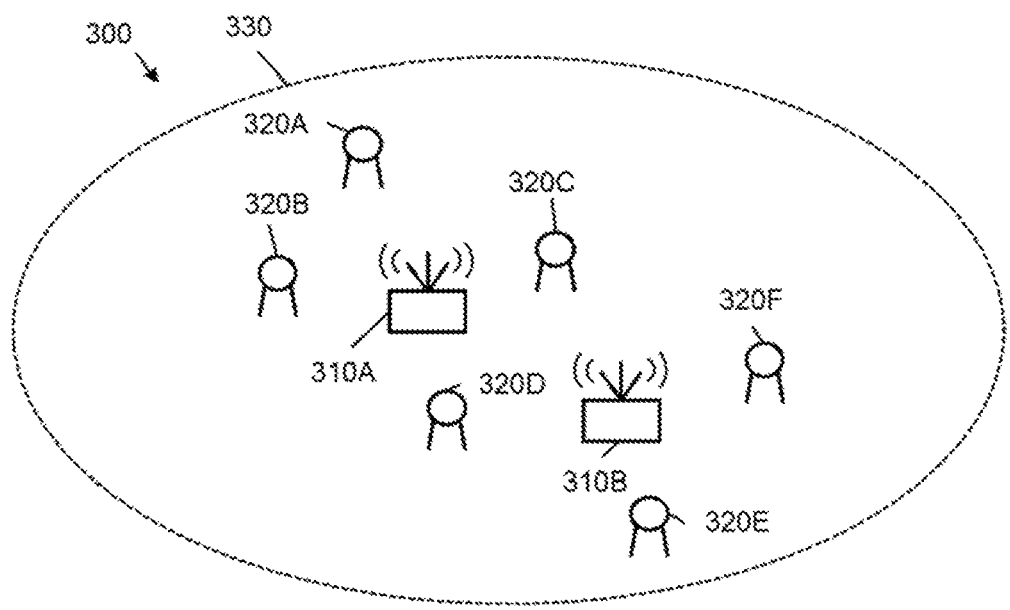
FIG. 5 is a schematic view of a system comprising a plurality of sensors in communication with WAPs, according to an example.

FIG. 5 is a simplified schematic block diagram of a system 300 according to an example. The system 300 comprises a first WAP 310A and a second WAP 310B, each of which is similar to the WAP 120 that is shown in FIG. 3, and a number of sensors, 320A-320F, each of which is similar to the sensor 110 that is shown in FIG. 3. The sensors 320A-320F are distributed within a secure perimeter 330 in locations that are proximal to the WAP 310A and the WPA 310B.

In FIG. 5, each one of the sensors, 320A-320F, is arranged to communicate with at least one WAP, 310A and 310B, in a manner similar to the system 100 of FIG. 3. According to an example the sensors 320A-320F can use security information exchanged with the WAPs 310A, 310B to establish a secure communications channel with at least one WAP, 310A or 310B.

Figure 6:
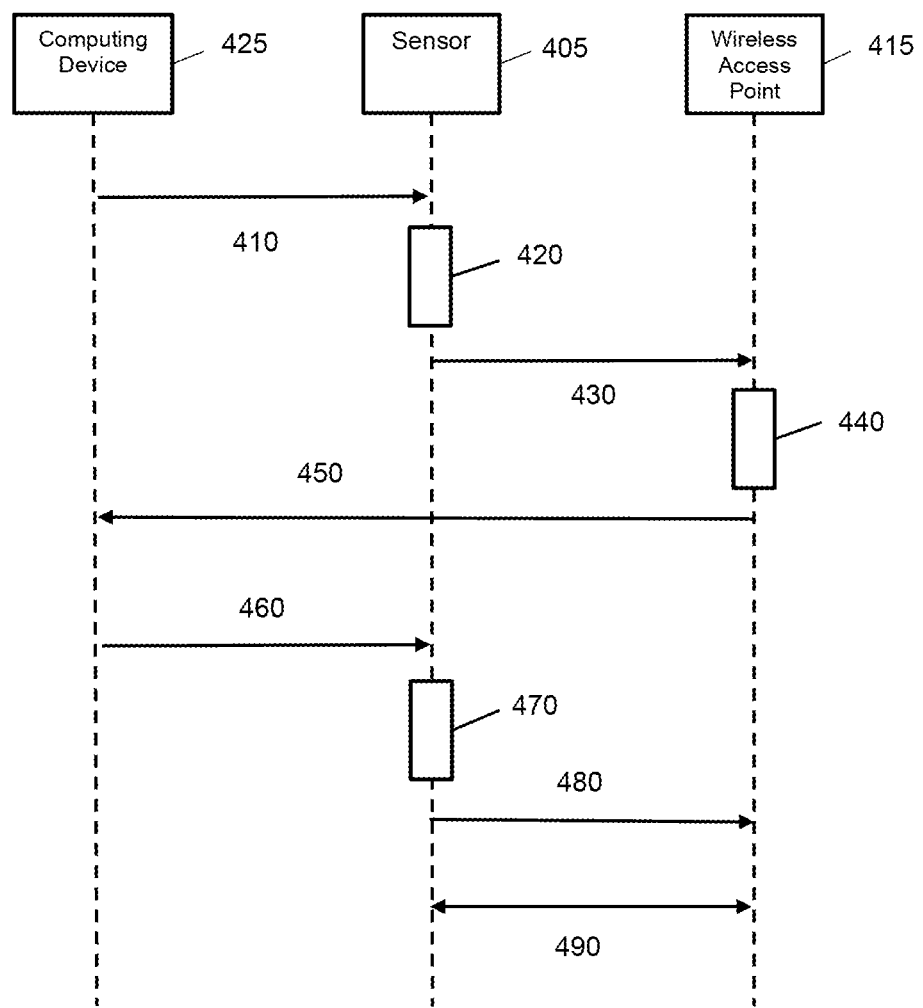
FIG. 6 is a message flow diagram illustrating an exchange of messages between a sensor, a WAP and a computing device, according to an example.

FIG. 6 is a message flow diagram, which illustrates, by way of example, an exchange of messages, in an arrangement of the kind that is illustrated in FIGS. 3 to 5, in which a sensor 405 establishes a secure communications channel with a WAP 415. The message flow is initiated by a computing device 425.

At step 410, the sensor 405 receives an initiation signal from the computing device 425 over a first communications channel between the computing device 425 and the sensor 405. At step 420, the sensor 405 is responsive to the initiation signal to generate and store first security information, which will be used to establish a secure communication session with the WAP 415.

At step 430, the sensor 405 transmits a first message comprising information representing at least a part of the first security information to the WAP 415 over a second communications channel, wirelessly. The WAP 415 is arranged to receive the first message transmitted by the sensor 405. In response to receipt of the message, at step 440, the WAP is arranged store the first message and to generate and store second security information. As described in relation to FIG. 3, the WAP 415 can transmit messages via a third communications channel to transmit to the computing device 425. A step 450, the WAP 415 is arranged to transmit a second message comprising information representing at least a part of the second security information to the computing device 425.

At step 460, the computing device 425 relays the second message over the first communications channel to the sensor 405. At step 470, the sensor 405 stores the second message.

The sensor 405 and WAP 415 now each hold at least part of the security information that has been generated by the other. The sensor 405 and WAP 415 can use the respective parts of the received security information in combination with the security information that they generated to perform secure communications with one another.

In FIG. 6, the sensor 405 is arranged to send an acknowledgement message to the WAP 415 at step 480 prior to establishing a secure connection for performing secure communications 490. The acknowledgement message informs the WAP 415 that the sensor 405 has received the second message, relayed by the computing device 425, and is now available to perform secure communications based on the shared security information.

According to an example, the shared security information comprises a shared cryptographic key generated from knowledge of the first and second security information. In particular, after exchanging messages comprising at least parts of the first and second security information, the sensor 405 and WAP 415 can generate a cryptographic key. One example of such a cryptographic key is that generated by the Diffie-Hellman protocol. In the case of the Diffie-Hellman protocol, the cryptographic key is derived from the first and second security information which each comprise arbitrary Diffie-Hellman parameters. In an example, the acknowledgement message sent at step 480 comprises a Message Authentication Code (MAC) derived from the cryptographic key generated by the sensor 405. The WAP 415 is arranged to generate a MAC from its own cryptographic key, and compare the generated MAC to the received MAC. If the generated MAC and the received MAC equal the same value, the WAP 415 has confidence that the key in the MAC is that which it generated and that the sensor 405 and WAP 415 are sharing the same cryptographic key. Subsequently the sensor 405 and WAP 415 can use the shared cryptographic key to authenticate but also encrypt messages between them in a secure communication session.

Referring back to FIG. 5, two or more of the sensors 320A-320F can use an exchange of messages over the various communications channels, similar to those described in FIG. 3 for a single sensor and WAP, to establish a secure communications channel between one another. For example, if sensor 320A has established a first secure communications channel with WAP 310A and sensor 320B has established a second secure communication session with WAP 310A, they may communicate via the WAP to establish a third secure communication session with each other.

In an example, two or more sensors can use a cryptographic protocol such as RSA encryption or Diffie-Hellman key exchange to establish a secure symmetric encryption key. In one case, following establishment of a secure communications channel via a WAP, sensors 320A-320F may be able to communicate directly with one another through their respective wireless interfaces, if they are in range of one another. In particular, it is possible to have a networked array of sensors distributed within the secure perimeter 330 once the sensors have received an initiation from a computing device as described at step 410.

Figure 7:
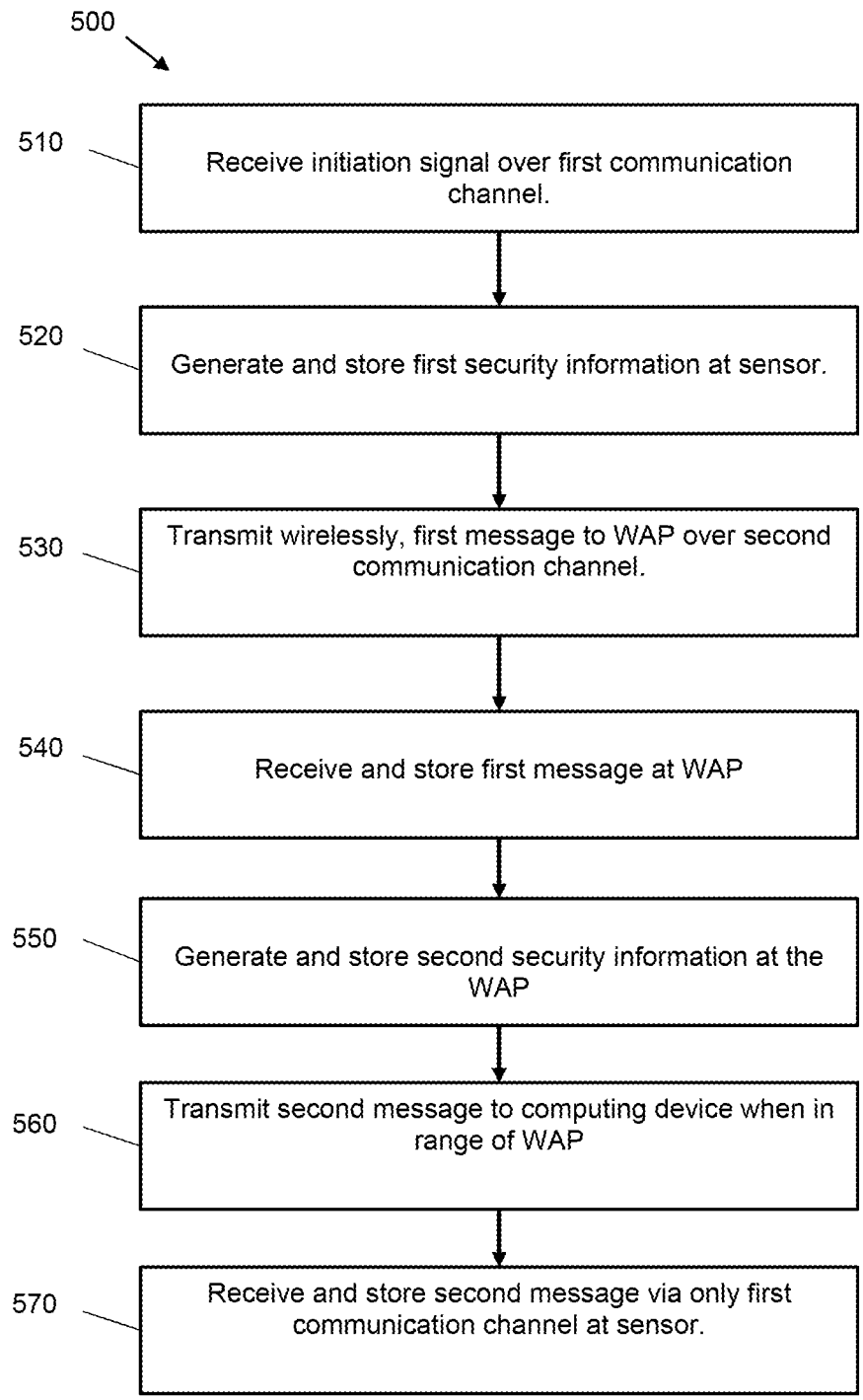
FIG. 7 is a flow diagram illustrating a method of exchanging security information according to an example.

FIG. 7 is a flow diagram illustrating a method 500 of exchanging security information between a sensor and WAP, according to an example. The method 500 may be implemented on the systems that are shown in FIGS. 1 to 5, which show various embodiments of systems comprising one or more sensors and WAPs.

At block 510, an initiation signal is received over a first communications channel from a relatively proximal computing device. According to an example the initiation signal is generated at a computing device such as computing device 140 shown in FIG. 3. At block 520, first security information is generated and stored at the sensor in response to the initiation signal received at block 510.

At block 530, a first message is transmitted wirelessly to the WAP over a second communications channel. The first message comprises information representing at least a part of the first security information. The first message may be transmitted via any suitable wireless communications channel such as over a Wi-Fi network or a wireless PAN such as ZigBee. According to an example, the first message comprises additional information such as location information or a serial number of the sensor or other pertinent parameters which were generated and/or sent to the sensor when the sensor received the initiation signal from the computing device.

At block 540, the first message is received and stored at the WAP. The WAP stores the first message.

At block 550 the WAP is arranged to generate and store second security information at the WAP. As described in relation to systems 100 to 300 in FIGS. 3 to 5 the first and second security information may comprise data relating to cryptographic keys and may be generated by executing one or more cryptographic operations on the sensor and WAP. The data relating to cryptographic keys can be used to establish, for example, shared cryptographic keys between the sensor and WAP to allow secure communications to be performed.

At block 560, the WAP is arranged to transmit a second message to the computing device via a third communications channel when in range of the WAP. The second message comprises information representing at least a part of the second security information. According to an example, transmission of the second message is via a transmission by the WAP and the computing device is arranged to receive the message when in the secure perimeter. In another example, the WAP has a separate communications channel with the computing device. For example, the method 500 may be used with a computing device and a system comprising a WAP and sensor, where the WAP has pre-configured secure communications channel with the computing device. The computing device is arranged to receive the second message transmitted by the WAP and to relay the message on to the sensor.

At block 570 the second message is received via only the first communications channel and is stored by the sensor. Arranging that the second message may be received only via the first communications channel ensures, in the case that the first communications channel is trusted and the computing device is trusted, that data contained in the message received at the sensor has not been accessed or modified by unauthorized users. Moreover, if, as described in relation to previous examples, the method is executed on a system in a secure perimeter and security arrangements are in place to ensure that the second message transmitted from the WAP cannot be intercepted by a malicious device (for example, through the use of physical shielding as described with reference to FIG. 4) then the second message received at the sensor has not been accessed or modified by unauthorized users.

Figure 8:
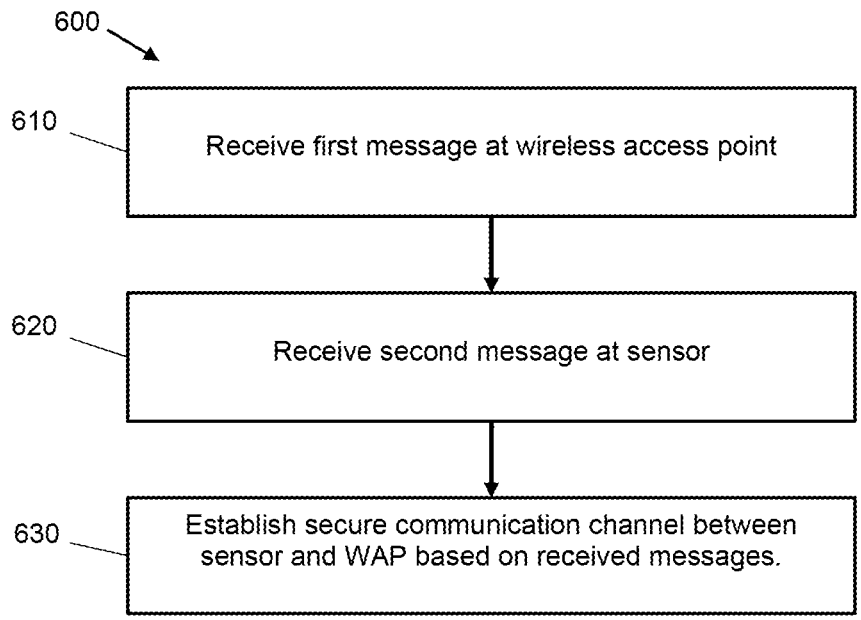
FIG. 8 is a flow diagram of a method of exchanging security information.

FIG. 8 is a flow diagram illustrating a method 600 of establishing a secure channel between a sensor and a WAP. The method 600 may generally be used in conjunction with the other methods and systems described herein to establish secure communications channels. In particular the method 600 may be implemented on the sensor and WAP shown in FIG. 3 to establish a secure connection.

At block 610 a first message is received at a WAP. For example, a first message is sent from a sensor (such as the sensor 110), comprising first security information which may be used to establish a secure communication session with the WAP. Alternatively, the message may originate from the sensor or may be received via a trusted third party (not shown in FIGS. 3 to 5), which communicates with the sensor and WAP.

At block 620 a second message is received at the sensor. For example, in one case, a computing device such as the computing device 140 described in FIG. 3 acts as a point of trust of communications with the sensor and passes a second message generated at the WAP to the sensor. The second message comprises, according to an example, information such as security information which is used by the sensor to establish a secure communications channel with the WAP. According to an example, the second message comprises information which can be used to derive security information to establish a secure communications channel with the WAP. For example, in the case where the exchanged messages comprise cryptographic keys, such as Diffie-Hellman keys, the actual security information may be derived from the information received in the first and second messages or used to generate further additional information which is used to establish the secure communication session, for example additional identifying information of the WAP and sensor. The steps at block 610 and 620 may be performed in response to receipt of an initiation signal at the sensor.

At block 630 a secure communications channel between the sensor and WAP is established, based on the received messages. For example, in the case that the messages comprise security information, the communications channel is established based on the security information. This could be as a result of, for example, a successful exchange of cryptographic public keys, allowing a symmetric key to be agreed between the parties.

Figure 9:
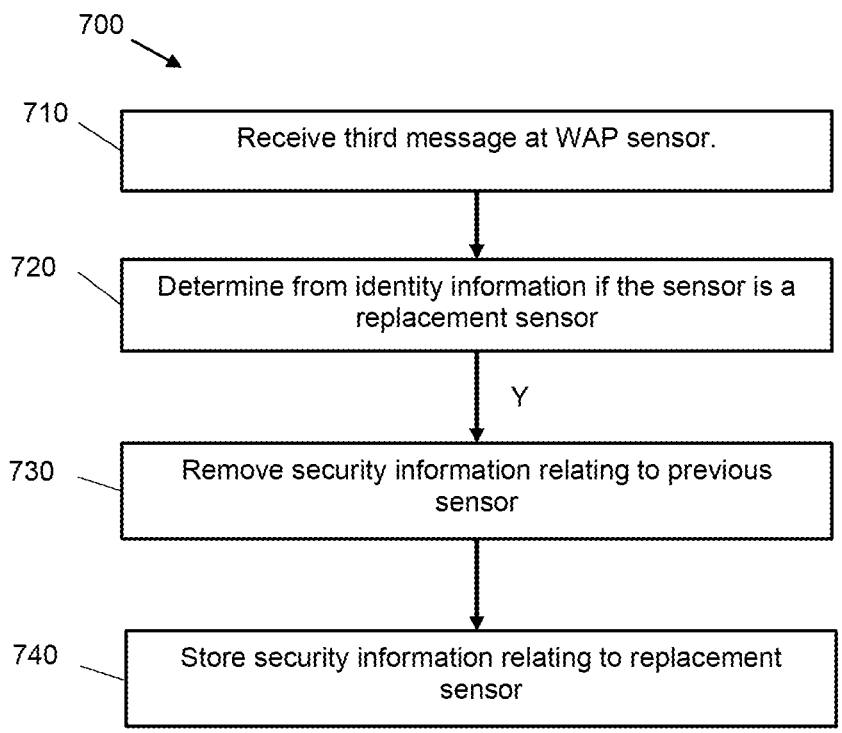
FIG. 9 is a flow diagram illustrating a method of removing redundant security information according to an example.

FIG. 9 is a flow diagram showing method 700, according to an example, of removing redundant security information accessible to a WAP. The method may be used in conjunction with the method 500 shown in FIG. 7, where a previous sensor has exchanged security information with a WAP, and where a new sensor replacing the first sensor, exchanges security information with the WAP. The WAP is arranged to determine, from identity information, if the new sensor is a replacement sensor. For example, in the case where the sensors and WAP establish secure communications channels using cryptographic techniques as described herein, the method 700 may be used to prevent legacy cryptographic keys being used to communicate with the WAP. According to an example the identity information in the new sensor identifies that the new sensor is a replacement sensor for the first sensor. For example, the identity information could be information identifying the sensor as a replacement based on role, or location or serial number identifying sensors and locations.

At block 710, a third message is received at the WAP from the sensor which has exchanged security information with the WAP according to the method 500 shown in FIG. 7. At block 720, the WAP is arranged to determine, from identity information if the sensor is a replacement sensor for a previous sensor. For example, in one case the sensor is identified by a serial number which can be checked against a database comprising known locations of sensors relative to the position of the WAP and serial numbers of sensors from which it can be determined if the sensor is a replacement sensor.

At block 730, if it is determined that the sensor is a replacement sensor, the WAP is arranged to remove any previous security information stored for a previous sensor with matching identity information. According to an example, this ensures that the WAP only stores security information relating to the sensors currently in use. For example, in the case where a system comprising a sensor and WAP, such as system 100 shown in FIG. 3 is implementing the method 700, and the system 100 is surrounded by a secure perimeter, the method 700 can be used to ensure it is only possible to establish a secure communications channel between sensors and the WAP which are identified in locations contained in the secure perimeter. At block 740, security information relating to the replacement sensor is stored at the WAP.

Figure 10:
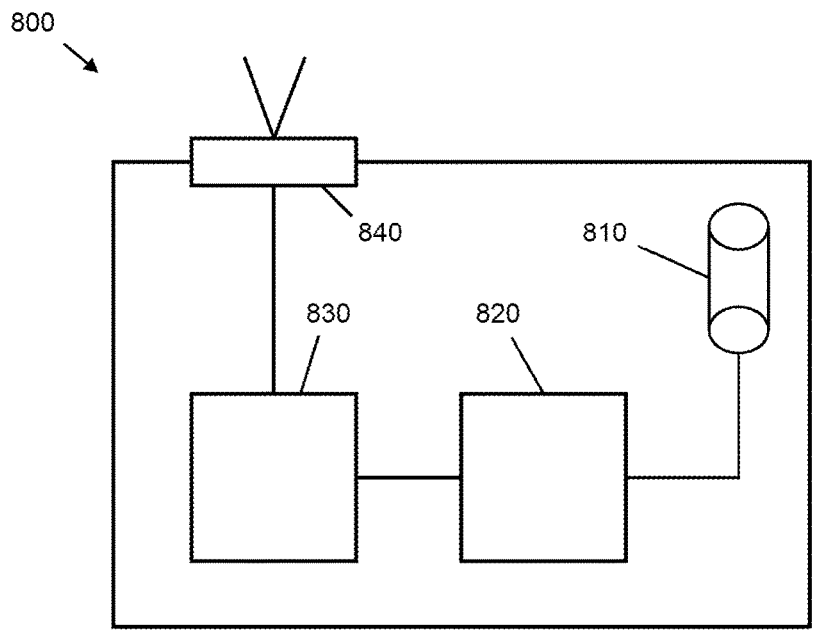
FIG. 10 is a schematic view of a sensor arrangement, according to an example.

FIG. 10 shows a sensor arrangement 800 according to an example. The sensor arrangement 800 may be used with the systems and methods described herein. The sensor arrangement 800 comprises a sensor 810 in communication with a processing device 820. The processing device 820 is arranged to facilitate processing operations with information received from a communications module 830 and also to communicate information received from the sensor 810 to the communications module. The communications module 830 is arranged to receive and transmit signals via a wireless interface 840. The wireless interface 840 may comprise antenna arranged to transmit and receive signals over two or more pre-configured bandwidths. In an alternative arrangement one or more bandwidths may be used to transmit and receive signals at the wireless interface 840. The processing device 820 (which may comprise one or more processors, as indicated above) can execute two or more communications protocols for sending and receiving signals via the communications module 830 and the wireless interface 840.

Methods and systems described above in relation to FIGS. 3 to 10 provide a means of securing an exchange of security information between a sensor (e.g. one of the sensors 13 of FIG. 1) and a WAP (e.g. the WAP 10 of FIG. 1). Examples of the system provide an improved means of establishing a secure communications channel between the sensor and WAP via the use of a trusted computing device in proximity to the sensor and WAP, which provides a means for exchanging the security information necessary to establish a secure communications channel in a way which prevents so called "man in the middle" attacks. In particular, the system described herein performs an assisted authenticated exchange of security information. The system does not require any security information to be pre-loaded on to the sensor before coming in to contact with the trusted computing device, however, advantageously the system provides guarantees to the WAP of the authenticity of the security information received from the sensor. Similarly, the sensor can be ensured of the authenticity of the security information received from the WAP. In the case where a secure communications channel is established using an exchange of cryptographic keys, the system guarantees the authenticity of the cryptographic keys as originating from the sensor and the WAP, without requiring an external party to vouch for the authenticity of the exchanged keys. Subsequent removal of a sensor and potential access of the sensor's security data will not have any effect on the system due to the fact that, once a new sensor is securely connected to the WAP, any previously-stored security data associated with the removed sensor is erased.

Figure 11A:
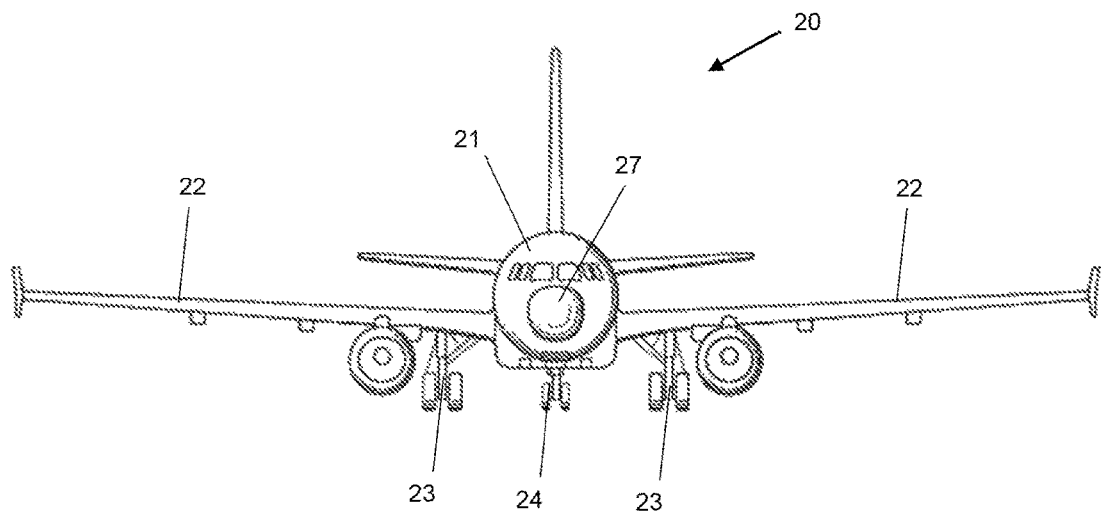
FIG. 11a is a schematic view of an aircraft comprising a WAP according to an example.
Figure 11B:
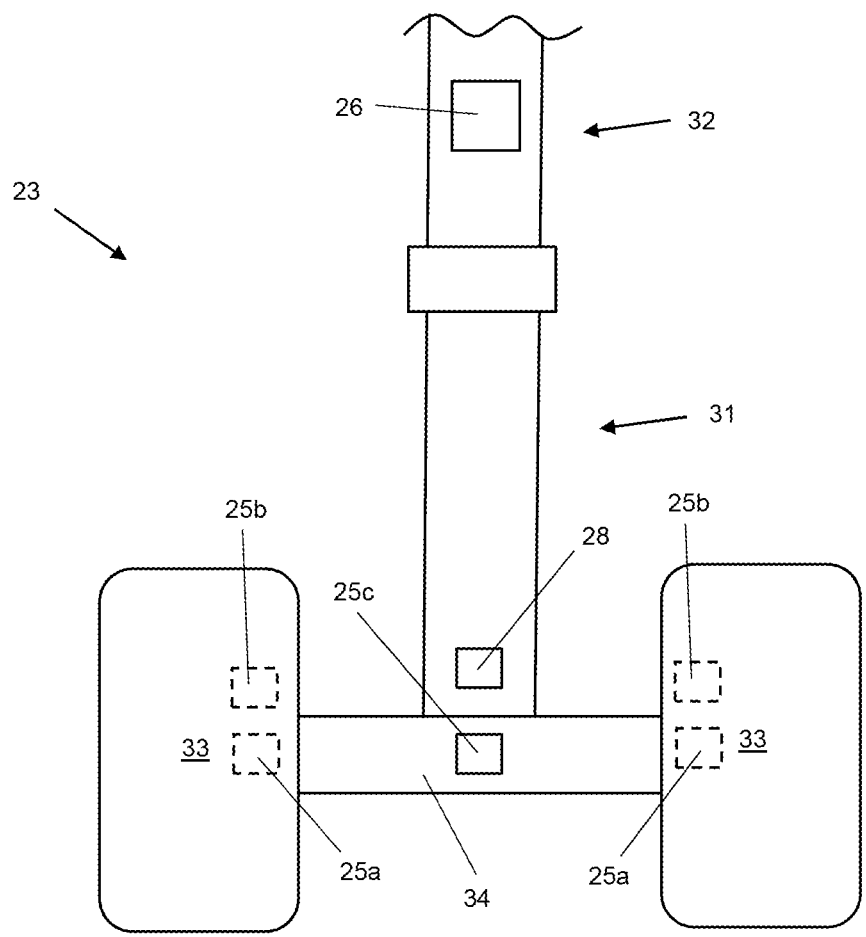

As discussed above, according to an example an arrangement of the WAP and one or more sensors may be used on an aircraft. In such an arrangement the WAP may be located near to or in the undercarriage of the aircraft and within range of the one or more sensors. Other arrangements and other kinds of sensors, in aircraft or in other scenarios may of course benefit from embodiments of the invention. FIG. 11a is a schematic illustration of an aircraft 20 comprising a fuselage 21, wings 22, main landing gear 23 and nose landing gear 24. FIG. 11b shows an example main landing gear 23 of the aircraft 20 in more detail. The main landing gear 23 comprises a lower part 31, an upper part 32, and wheels 33 (the number of wheels 33 will depend on the type of the aircraft 20). The lower part 31 in the illustrated example comprises a bogie (or axle) 34.

The aircraft 20 further comprises a plurality of sensors 25a-c at various locations on the aircraft. The aircraft 20 may include various sensors of differing types at various locations, and may include more than one of any given type of sensor. Each sensor may be configured to generate sensor data relating to a different aircraft parameter, or more than one of the sensors may be configured to generate sensor data relating to the same aircraft parameter. For ease of depiction, all of the illustrated sensors 25a-c are comprised in the main landing gear 23, however; this should not be taken to indicate that the aircraft does not also include other sensors at other locations.

In the illustrated example, the sensors on the main landing gear 23 comprise a tyre pressure sensor brake temperature sensor 25a for each wheel 33, a brake wear sensor 25b for each wheel 33 and a load sensor 25c on the bogie or axle 34. The aircraft further comprises a WAP 26 on the upper part 32 of each main landing gear 23, and an avionics system 27 located in an avionics bay in the fuselage 21. In some examples the aircraft may comprise further WAPs, in locations other than on the main landing gear (for example in a one or more landing gear bays) The avionics system 14 has a communications link (which may be wired, wireless or partly wired and partly wireless) with each WAP of the aircraft. The avionics system may also have a direct (i.e. not via a WAP) communications link with one or more sensors of the aircraft. In the illustrated example the aircraft further comprises a relay 28 on the bogie 34 of each main landing gear 23. The relay has a wireless communications link to the WAP 26, and wired communications links to each brake temperature sensor 25a comprised in the main landing gear 23. In the particular example, each of the wheel brake wear sensors 25b and the load sensor 25c has a direct wireless communications link to the WAP 26. However; in other examples the brake wear sensors 25b and/or the load sensor 25c may have a wired connection to the avionics system 27, and sensor data generated by those sensors having a wired connection to the avionics system 27 may be sent to the WAP via the avionics system 27.

The components of the aircraft 20 may have any or all of the features of the equivalent components described above in relation to FIGS. 1 to 10.

Although the invention has been described above with reference to one or more 10 preferred embodiments, it will be appreciated that various changes or modifications may be made without departing from the scope of the invention as defined in the appended claims.

The invention claimed is:

1. A Wireless Access Point (WAP) for enabling remote access to data generated by systems of an aircraft, the WAP comprising:
   a wireless interface comprising a transmitter and a receiver; and
   a processor;
   wherein the WAP is configured to:
   wirelessly receive sensor data via at least one wireless communications link from a plurality of sensors on an aircraft, wherein the sensor data are generated by the plurality of sensors;
   receive aircraft data via a wired or wireless communications link from an avionics system of the aircraft;
   wirelessly receive a data request signal via a wireless communications link from a remote computing device; and
   responsive to the data request signal, wirelessly transmit certain data to the remote computing device data via the wireless communications link, wherein the certain data is based on received sensor data and/or the received aircraft data.

2. The WAP according to claim 1, wherein the wired or wireless communications link between the WAP and the avionics system is a wired connection.

3. The WAP according to claim 1, wherein the WAP is further configured to receive, from the avionics system, further sensor data generated by at least one further sensor on the aircraft.

4. The WAP according to claim 1, wherein:
   the data transmitted to the remote computing device comprises data covering a specific time period, wherein the specific time period is specified by the data request signal received from the remote computing device; and/or
   the data transmitted to the remote computing device comprises data from one or more specific sensors, wherein the one or more specific sensors is specified by the data request signal received from the remote computing device; and/or
   the data transmitted to the remote computing device comprises aircraft data of a specific type, wherein the specific type of the aircraft data is specified by the data request received from the remote computing device.

5. The WAP according to claim 1, further comprising a non-transitory memory, wherein the WAP is further configured to store the received sensor data and received aircraft data in the non-transitory memory, and wherein the transmitted data is based on sensor data and/or aircraft data stored in the non-transitory memory.

6. The WAP according to claim 5, wherein the non-transitory memory stores identifying information associated with the WAP, and wherein the WAP is further configured to wirelessly transmit the identifying information to the remote computing device responsive to an identification request signal received from the remote computing device.

7. The WAP according to claim 1, wherein the WAP is configured to wirelessly communicate with the remote computing device when the remote computing device is within a predetermined perimeter, and is not able to wirelessly communicate with the remote computing device when the remote computing device is outside the predetermined perimeter.

8. An aircraft comprising:
a plurality of sensors, each sensor being configured to generate sensor data relating to a different aircraft parameter; and
a WAP according to claim 1.

9. The aircraft according to claim 8, wherein a wireless communications link connects at least one sensor of the plurality of sensors to the WAP, and wherein the wireless communications link is a secure wireless communications link.

10. The aircraft according to claim 8, further comprising a relay having a wired communications link to at least one sensor of the plurality of sensors and a wireless communications link to the WAP, wherein the relay is configured to receive sensor data generated by the at least one sensor over the wired communications link and to transmit the received sensor data to the WAP over the wireless communications link.

11. The aircraft according to claim 8, wherein the aircraft comprises a landing gear, wherein the plurality of sensors and the WAP are located on the landing gear.

12. The aircraft according to claim 11 wherein:
the landing gear comprises a bogie, and a relay located on the bogie; or
the landing gear comprises an axle and the relay is located on the axle; or
the landing gear comprises a landing gear leg and the relay is located on the landing gear leg; or
the landing gear comprises a brake pack having a housing, and the relay is located on the brake pack housing.

13. The aircraft according to claim 8, wherein the plurality of sensors comprises one or more of:
at least one tire pressure sensor;
at least one brake temperature sensor;
at least one brake wear sensor;
at least one landing gear load sensor;
at least one wheel speed sensor;
at least one proximity sensor;
at least one pressure sensor;
at least one position sensor.

14. The aircraft according to claim 13, wherein the plurality of sensors comprises one or more of:
a landing gear load sensor having a communications link with an avionics system of the aircraft, wherein the landing gear load sensor is configured to transmit landing gear load sensor data to the avionics system, and wherein the WAP is configured to receive landing gear load sensor data from the avionics system;
a steering angle sensor having a communications link with an avionics system of the aircraft, wherein the steering angle sensor is configured to transmit steering angle sensor data to the avionics system, and wherein the WAP is configured to receive steering angle sensor data from the avionics system; and
a towing sensor having a communications link with an avionics system of the aircraft, wherein the towing sensor is configured to transmit towing sensor data to the avionics system, and
wherein the WAP is configured to receive towing sensor data from the avionics system.

15. The aircraft according to claim 8, wherein at least one sensor of the plurality of sensors comprises a non-transitory memory, and wherein the non-transitory memory stores identification information associated with the sensor.

16. The aircraft according to claim 15, wherein the at least one sensor is configured to store generated sensor data in the non-transitory memory.

17. The aircraft according to claim 8, further comprising an avionics system having a wired communications link to the WAP.

18. The aircraft according to claim 17, wherein the avionics system is configured to receive sensor data from at least one sensor on the aircraft, and to transmit the received sensor data to the WAP.

19. The aircraft according to claim 17, further comprising a non-transitory memory accessible by the avionics system, wherein the non-transitory memory stores aircraft data, and wherein the avionics system is configured to transmit the aircraft data to the WAP in response to receiving a data request from the WAP.

20. The aircraft according to claim 19, wherein the avionics system is configured to receive sensor data from at least one sensor on the aircraft and/or from the WAP, and to store the received sensor data in the non-transitory memory.

21. An aircraft comprising:
an avionics system;
a wireless Access Point (WAP) configured to enable remote access to data generated by systems of an aircraft, the WAP comprising a wireless interface comprising a transmitter and a receiver and a processor, wherein the WAP is configured to:
wirelessly receive sensor data generated by a plurality of sensors on an aircraft;
receive aircraft data from the avionics system;
wirelessly receive a data request signal from a remote computing device; and
responsive to the data request signal, wirelessly transmit to the remote computing device data based on received sensor data and/or received aircraft data;
wherein the plurality of sensors comprises at least one first sensor having a wired communications link to a relay, wherein the relay is configured to receive sensor data generated by the at least one sensor over the wired communications link and to transmit the received sensor data to the WAP over the wireless communications link, and at least one second sensor having a wireless communications link to the WAP;
wherein the at least one first sensor comprises a brake temperature sensor or a brake wear sensor; and
wherein the at least one second sensor comprises one of:
a brake wear sensor; a brake pressure sensor; a tire pressure sensor; a wheel speed sensor; a landing gear load sensor; an oleo pressure sensor; an oleo temperature sensor; a proximity sensor; a fuel data sensor; a towing sensor; proximity sensor; a position sensor.

22. A method for remotely accessing data generated by systems of an aircraft, the method comprising:
generating sensor data by each of a plurality of sensors on the aircraft;
wirelessly receiving the generated sensor data at a Wireless Access Point (WAP) located remotely from each of the plurality of sensors;
receiving aircraft data from an avionics system of the aircraft, wherein the avionics system is separate from the WAP;
wirelessly receiving a data request from a remote computing device; and
responsive to receiving the data request, wirelessly transmitting to the remote computing device data representative of at least one of the received sensor data and the received aircraft data.

23. The method of claim 22 wherein the wireless transmission to the remote computing device is preformed while the remote computing device is outside of the aircraft and within a secured area surrounding the aircraft.

24. The method of claim 22 wherein the data request signal is request for certain information in the received sensor data and the data wirelessly transmitted to the remote computing device includes the requested certain information in the received sensor data.

25. A Wireless Access Point (WAP) on an aircraft and configured to enable remote access to data generated by systems of the aircraft, the WAP comprising:
a wireless interface comprising a transmitter, a receiver and a processor;
wherein the WAP is configured to:
wirelessly receive sensor data generated by a plurality of sensors on an aircraft;
receive aircraft data from an avionics system of the aircraft, wherein the avionics system is separate from the WAP;
wirelessly receive via the receiver a data request signal from a mobile remote computing device; and
responsive to the data request signal, wirelessly transmit via the transmitter to the mobile remote computing device data representative of the received sensor data and/or the received aircraft data and only while the remote computing device is within a secured perimeter and only transmit within the secured perimeter.

* * * * *